Feb. 13, 1973
R. L. GRANT
3,715,927
GAUGE FOR INDICATING EXHAUST TIME
OF AIR SUPPLY FOR SCUBA DIVERS
Filed March 5, 1971
2 Sheets-Sheet 1
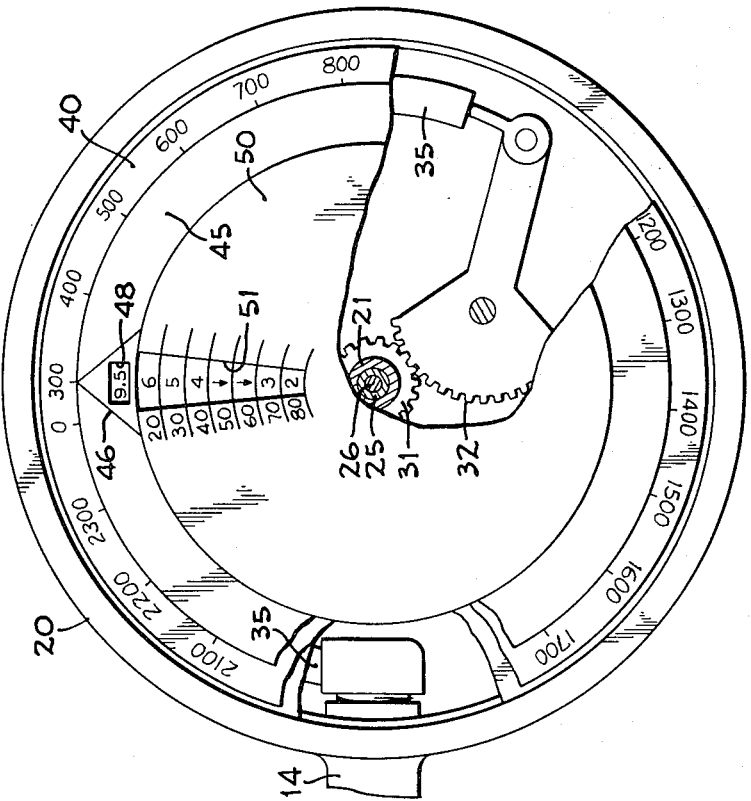
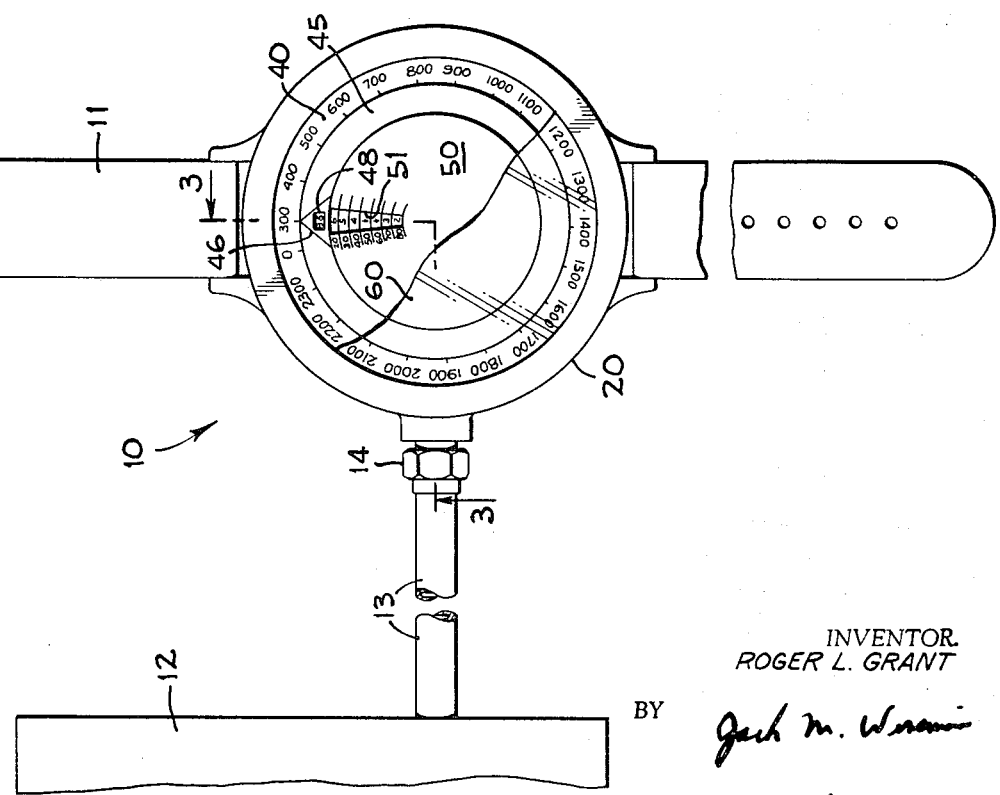
INVENTOR.
ROGER L. GRANT
BY
*Jack M. Worsum*
ATTORNEY Feb. 13, 1973   R. L. GRANT   3,715,927
GAUGE FOR INDICATING EXHAUST TIME
OF AIR SUPPLY FOR SCUBA DIVERS
Filed March 5, 1971   2 Sheets-Sheet 2
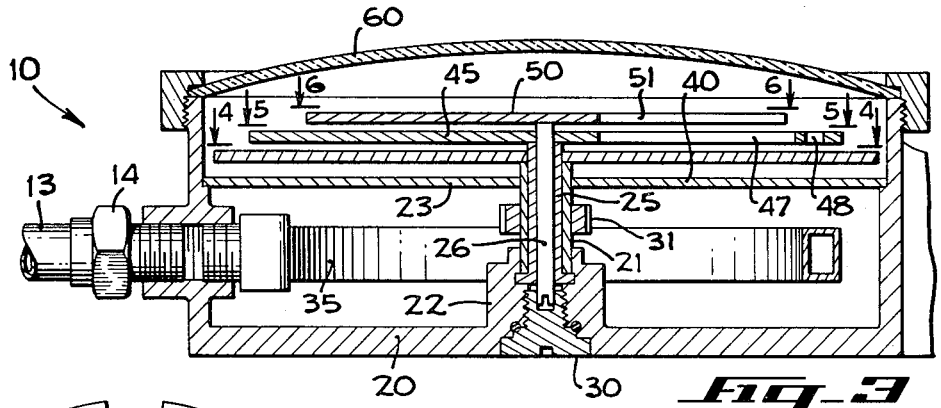
Fig_3
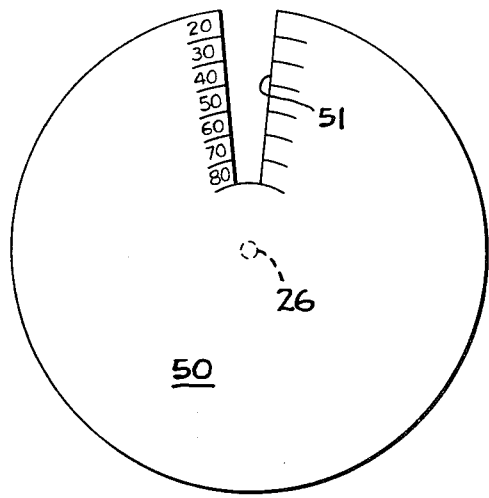
Fig_6
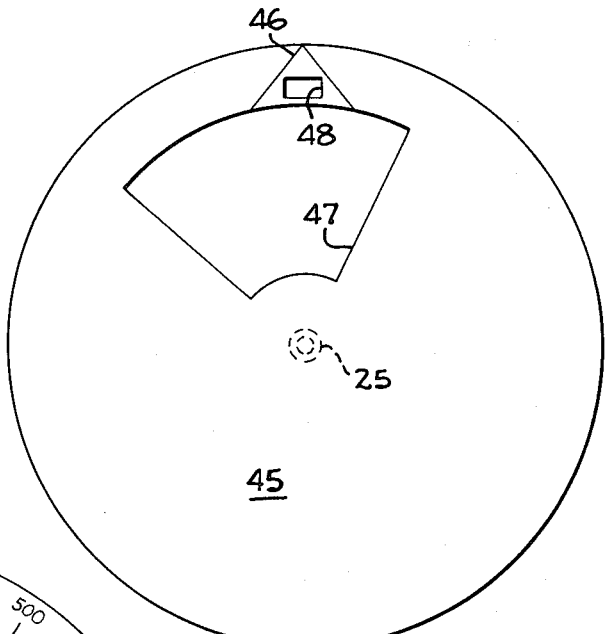
Fig_5
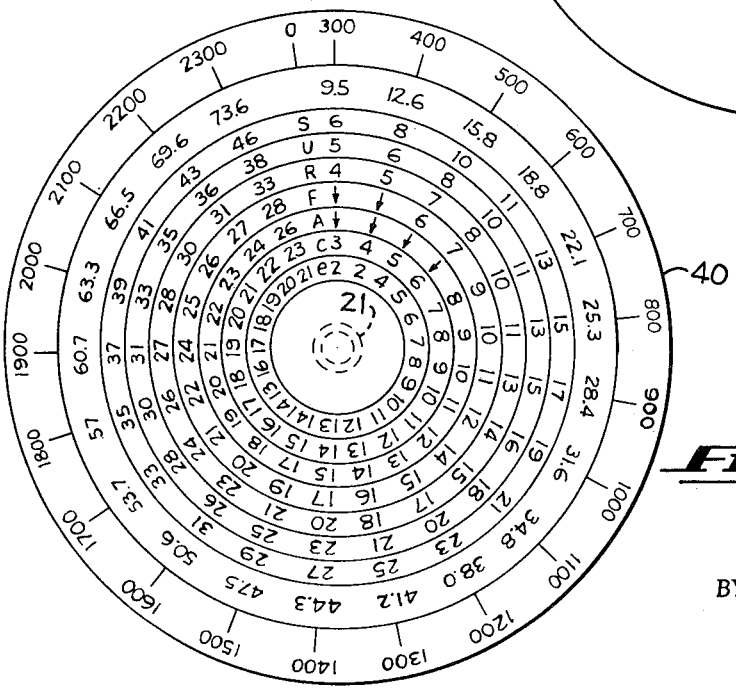
Fig_4
INVENTOR.
ROGER L. GRANT
BY Jack M. Wiseman
ATTORNEY

3,715,927

GAUGE FOR INDICATING EXHAUST TIME OF AIR SUPPLY FOR SCUBA DIVERS

Roger L. Grant, 1243 Monte Vista St.,
San Luis Obispo, Calif. 93401
Filed Mar. 5, 1971, Ser. No. 121,255
Int. Cl. G01l 19/00, 7/04
U.S. Cl. 73—389          8 Claims

ABSTRACT OF THE DISCLOSURE

A wrist-type gauge for a scuba diver to enable the scuba diver to take a direct reading as to the time remaining before the exhaustion of the air supply. Toward this end, the gauge comprises relatively rotatable discs. One disc is connected to the air tank and is displaced angularly in response to variations in air pressure in the tank. Time remaining indicia are disposed in columns radially on the one disc under associated air pressure magnitudes. Another disc has a radially disposed opening to expose a column of radially aligned time remaining indicia on the one disc. On the other disc is disposed radially aligned depth indices adjacent an opening. An operator is informed of the depth of his location and reads through the opening the exposed time remaining for the exhaustion of air in the tank by aligning through radial distance the time remaining value with the selected depth of location.

BACKGROUND OF THE INVENTION

The present invention relates in general to gauges and more particularly to a gauge for scuba divers.

Heretofore, under water gauges were connected to the air tank of scuba divers to enable a scuba diver to read the pressure of the air in the tank. Calculators in the form of slide rules have also been employed to correlate depth and air exhaust time. In spite of such devices, there has not been available a device that is connected to the air tank from which the scuba diver can read directly the time remaining for the exhaustion of the supply of air at various depths.

Patents of interest are as follows: Harland, No. 3,187,572; Alinari, No. 3,023,244; Cerny, No. 2,986,038; Droz, No. 3,111,033; Brunet, No. 3,124,928; Sage, No. 2,638,866; Des Granges, No. 3,058,653; Adams, No. 2,550,033; Mott, No. 1,856,079; Baker No. 1,766,581; Thompson, No. 1,683,743.

SUMMARY OF THE INVENTION

A gauge for a direct reading of exhaustion time for a supply of gas in a container comprising relatively rotatable sections. One section is connected to the supply of gas and is displaced angularly in response to variations of the pressure of the gas. Radially disposed time indicia are on the one section. Another section includes means for exposing radially disposed time indicia on the first section. Radially disposed depth indices are disposed along said means, whereby an operator informed of the depth correlates the selected depth index with an aligned time indicia to read directly the exhaust time remaining for the gas in the container.

DESCRIPTION OF THE DRAWINGS

FIG. 1 is a fragmentary diagrammatic plan view of the gauge of the present invention connected to an air cylinder.

FIG. 2 is an enlarged fragmentary diagrammatic plan view of the gauge shown in FIG. 1 with the transparent cover removed.

FIG. 3 is an enlarged diagrammatic vertical section view taken along line 3—3 of FIG. 1 and shown partially in elevation to illustrate a drive arrangement for operating a shaft in response to variations in air pressure.

FIG. 4 is a diagrammatic plan view of a disc of the gauge shown in FIG. 1 taken along line 4—4 of FIG. 3 that is angularly displaced in response to variations in air pressure.

FIG. 5 is a diagrammatic plan view of a disc of the gauge shown in FIG. 1 taken along line 5—5 of FIG. 3 that remains fixed and includes an arrow to provide a marker to indicate air pressure.

FIG. 6 is a diagrammatic plan view of a disc of the gauge of FIG. 1 taken along line 6—6 of FIG. 3 that is adjustable and has thereon depth indices and a window to expose the exhaust time indicia for a direct reading.

DESCRIPTION OF THE PREFERRED EMBODIMENTS

Illustrated in FIG. 1 is a gauge 10 of the present invention that enables a scuba diver to read directly therefrom the exhaust time remaining in his supply of air. In the exemplary embodiment, the gauge 10 is secured to the wrist of the scuba diver as a wrist gauge. Toward this end, a suitable and conventional wrist strap 11 is attached to the gauge 10. The wrist gauge 10 is connected to the supply of air, such as air cylinder or air tank, through a flexible hose 13. The air cylinder or air tank 12 is conventional equipment for scuba divers. While reference is made herein to air, the present invention is adaptable to gas under pressure contained in a suitable container. Air and gas will be used interchangeably herein and one is intended to encompass the other. The air in the cylinder 12 is, of course, under pressure. The gauge 10 is connected to the hose 13 by conventional fittings 14 along the side thereof. Hence, air under pressure in the tank 12 communicates with the gauge 10 through fittings connected to the side of the gauge 10.

The gauge 10 comprises a suitable waterproof and air tight cylindrical housing 20 (FIG. 3). Axially disposed within the cylindrical housing 20 is a tubular shaft 21. The shaft 21 is journalled for rotation by suitable brackets 22 and 23 that are fixed to the inner wall of the housing 20. Concentric with the rotatable shaft 21 is a tubular post 25 that extends below the shaft 21 and is fixed to the bracket 22. The tubular post 25 is disposed within the tubular shaft 21 with the outside diameter of the post 25 slightly less than the inside diameter of the shaft 21. A rotatable shaft 26 is disposed within the fixed tubular post 25 and is journalled for rotation by the bracket 22. The outside diameter of the shaft 26 is slightly less than the inside diameter of the tubular post 25, and rotatably supported therein. The lower portion of the shaft 26 forms an adjustment screw so that the scuba diver can selectively impart manually rotation thereto. An O-ring cap 30 is threaded to the housing 20 to seal off the access to the screw end of the shaft 26.

Angular displacement or rotatable movement is imparted to the shaft 21 in response to variations in air pressure in the cylinder 12. This structure is conventional and well-known as described in the patent to Sage, No. 2,638,866, and the patent to Harland, No. 3,187,572. Briefly, a pinion 31 is fixed to the shaft 21 to impart rotation thereto. Meshing with the pinion 31 is a rack 32 for driving the pinion 31. The rack 32 is coupled to the free end of a conventional Bourdon tube 35, which is attached to the housing 20 at its fixed end or "dead end." The free end of the Bourdon tube 35 is sealed and includes a tip that is linked to the rack 32 for imparting a reciprocating movement thereto.

According to the present invention, a rotatable disc 40 (FIGS. 3 and 4) is disposed within the housing 20 and fixed to the shaft 21 for rotation therewith. The disc 40 will be angularly displaced commensurate with variations in air pressure of the air in the cylinder 12. Along the periphery of the upper surface of the disc 40 are air pressure indicia over a range between 0–2300 p.s.i. Radially inward of each indicia for air pressure is indicia to show the volume in cubic feet of air in the cylinder 12. The volume of air indicia is spaced radially inward from the air pressure corresponding therewith. Thus, the outermost circumferential path is the air pressure indicia, the concentric path radially inward thereof covering 360° is the air volume indicia. Radially inward of each air pressure indicia are indicia for time remaining in minutes before the supply of air in the cylinder 12 is exhausted. Radially aligned with each air pressure magnitude is a column of indicia representing the time in minutes remaining before the supply of air in the cylinder 12 is exhausted taken over a range of depth from 20 feet to 80 feet in increments of ten feet. The air volume indicium is between the corresponding air pressure indicium and the associated columns of time-remaining indicia. The time remaining magnitude for 80 feet in depth is closest to the axis of rotation and the time remaining magnitude for 20 feet in depth is adjacent the associated air volume indicium. The time remaining indicia for each given depth defines a concentric path with the air pressure indicia over 360 degrees. Of course, the depth magnitude is considered from the surface of the water for the location of the scuba diver.

Disposed above the disc 40 and concentric therewith is a disc 45 (FIGS. 3 and 5), which is fixed to the stationary post 25. The disc 45 is formed with an arrow 46, which points to the air pressure indicia on the disc 40 and thereby indicates the air pressure of the air in the cylinder 12. As previously described, the disc 40 is displaced angularly in response to the air pressure in the cylinder 12. Of course, the gauge 10 is assembled and the arrow 46 is arranged to point to the correct indicia to reflect an accurate reading of the air pressure. Also formed in the disc 45 is an opening 47 suitable to expose four successive radially disposed columns of time remaining indicia on the disc 40. Also, an opening 48 is formed in the arrow 46 to expose the volume of air indicium associated with the air pressure indicium to which the arrow points.

Above the disc 45 and concentric therewith is a disc 50, which is fixed to the shaft 26 for movement therewith. Formed in the disc 50 is an opening 51, which exposes the radially disposed column of time remaining indicia radially aligned with the air pressure indicium to which the arrow 46 points or which represents the air pressure of the cylinder 12. Adjacent the opening 51 is a column of radially aligned indices representing the depth in feet over a range from 20 feet to 80 feet. The scuba diver is informed of his depth through a conventional wrist depth gauge for indicating the depth of the location of the scuba diver, such as the gauge disclosed in Pat. No. 2,986,038, or Pat. No. 3,124,928. To determine the time remaining before the exhaustion of the air supply in the cylinder 12, the scuba diver selects his depth location and reads from through the opening 51 the time remaining indicium that is adjacent the accurate depth index or is of the same radial distance as is the correct depth index.

It is known that the consumption of air varies with individuals. Therefore, the disc 50 is adjusted angularly through the screw end of the shaft 26 (FIG. 3) to fit the individual consumption rate of the scuba diver. If this adjustment were omitted, then the arrow would be on the disc 50 and the disc 45 could be omitted.

In operation, air under pressure from the cylinder 12 is conducted into the housing 20. The rack 32 and pinion 31 is actuated by a Bourdon tube and linkage to displace the disc 40 commensurate with variations in air pressure in the cylinder 12. A scuba diver can observe the arrow 46 to determine the air pressure in the cylinder 12, and can observe through the opening 48, the volume of air in the cylinder 12. By knowing the depth of his location, the scuba diver can read directly from the opening 51 the time remaining before the air supply in the cylinder 12 is exhausted by reading the time remaining indicium adjacent the selected depth index.

The face of the gauge 10 is waterproof and air tight through the sealing of a magnifying lens 60 to the housing 20 to cover the face of the gauge 10. A rubber bezel guard can be employed for this purpose as disclosed in Pat. No. 2,986,038.

I claim:
1. A gauge comprising:
 (a) a housing;
 (b) a first disc journalled for rotation in said housing, said first disc having thereon columns of radially disposed indicia to indicate time remaining before the exhaustion of a supply of gas in a container;
 (c) means in said housing connected to said first disc and responsive to the pressure of the gas in the container for angularly displacing said first disc an amount commensurate with variations in the pressure of the gas;
 (d) a member mounted in said housing above said first disc with a column of depth indices thereon, said member being adapted for movement about the axis of said first disc, whereby the magnitude of the depth index indicates from said first disc the indicium for indicating time remaining for the exhaustion of the gas in the container; and
 (e) means in said housing fixed to said member for imparting movement to said member about the axis of said first disc for adjusting said gauge to fit the individual gas consumption rate of an operator.

2. A gauge as claimed in claim 1 wherein said member is a second disc concentric with said first disc and formed with a radially disposed opening exposing a column of radially disposed time remaining indicia to said first disc, and said column of depth indices is radially disposed and adjacent to said opening in said second disc, whereby the time remaining indicium is located at a radial distance equal to the radial distance of the selected depth index.

3. A gauge as claimed in claim 2 and comprising a magnifying glass disposed over said second disc in sealing engagement with said housing.

4. A gauge as claimed in claim 1 wherein said housing is cylindrical and in combination with a container with gas under pressure, and means communicating with said container and said housing for conducting gas under pressure into said housing, said conducting means being connected to said housing along the cylindrical wall thereof.

5. A gauge as claimed in claim 4 and comprising straps connected to said housing for securing said gauge to the wrist of an operator.

6. A gauge as claimed in claim 1 wherein said first disc has indicia of magnitudes of gas pressure along the periphery thereof, each of said indicia of magnitudes is aligned with a selected column of radially disposed time remaining indicia.

7. A gauge as claimed in claim 6 and comprising a third disc in said housing and concentric with said first and second discs and formed with an opening exposing a plurality of columns of radially disposed time remaining indicia, said third disc being fixedly positioned in said housing, an indicator on said third disc adjacent the peripheral surface thereof indicates the pressure of the gas in the container.

8. A gauge as claimed in claim 7 wherein said first disc has volume of gas indicia between associated indicia of gas pressure magnitudes and columns of radially disposed time remaining indicia, said volume indicia define a circumferential path, said third disc being formed with an opening in said indicator thereon for exposing the appropriate volume of gas indicium.

References Cited

UNITED STATES PATENTS 2,565,526   8/1951   Seitz _____ 73—388
3,187,572   6/1965   Harland _____ 73—300 X DONALD O. WOODIEL, Primary Examiner U.S. Cl. X.R.

73—411